Sept. 8, 1964 L. KATZ 3,147,802

HEAT RADIATOR

Filed Aug. 4, 1961 2 Sheets-Sheet 1

INVENTOR.

Leonhard Katz

BY

ATT'YS

Sept. 8, 1964

L. KATZ 3,147,802

HEAT RADIATOR

Filed Aug. 4, 1961

2 Sheets-Sheet 2

INVENTOR.
Leonhard Katz
BY
Roberts, Cushman + Grover
ATT'YS 3,147,802
HEAT RADIATOR

Leonhard Katz, Woburn, Mass., assignor to Astro Dynamics, Inc., Burlington, Mass., a corporation of Massachusetts Filed Aug. 4, 1961, Ser. No. 129,316
10 Claims. (Cl. 165—185)

This invention relates to heat exchangers and more particularly to a device for drawing off heat from small heat producing electronic components. This application is a continuation-in-part of my copending application Serial No. 88,122, filed February 9, 1961, and entitled Heat Radiator.

In various situations the removal of heat from electronic apparatus becomes quite critical. Heat is a problem when it is desired to run transistors, silicon diodes or the like at maximum power. The efficiency of these components decreases as the temperature rises and, further, high temperatures may lead to a progressive situation the maintenance of which will quickly cause the destruction of the component.

A second situation in which heat is a problem is when miniaturization of electronic equipment is attempted. The metal chassis which is typically associated with the apparatus will often have insufficient radiating surface to dispose of the entire thermal load and will present too high a thermal resistance immediately adjacent the heat source so that a slow temperature buildup results.

Accordingly, objects of the present invention are to provide a heat radiator for electronic components which provides a large surface for heat radiation and for giving off heat to convection currents, which has a very low thermal resistance immediately adjacent the heat producing element, which is compact and of light weight, and which is of simple and inexpensive manufacture.

In brief summary a heat radiator according to the invention comprises a substantially flat plate having upstanding from at least one face thereof a plurality of fins. Each fin includes at least one transverse flange and there is provided a means for thermally connecting a central portion of one side of the plate to a heat producing element.

In a particular aspect the fins are parallel one another as are the flanges so that all transverse sections of the radiator are substantially similar whereby the radiator may be manufactured largely by the relatively inexpensive process of extrusion.

Figure 1:
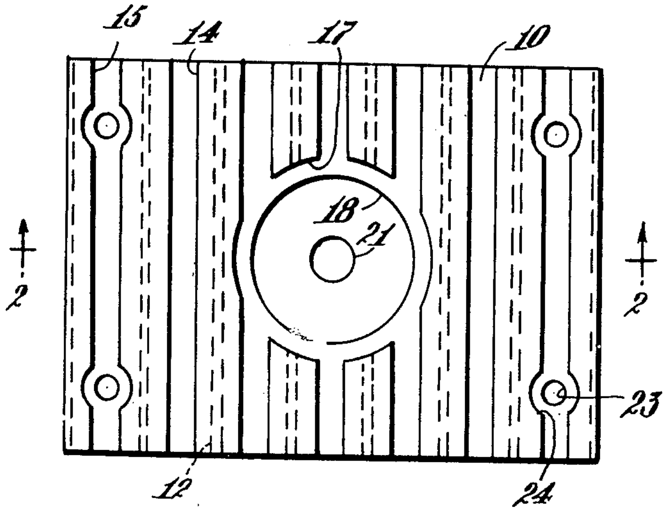
Figure 2:
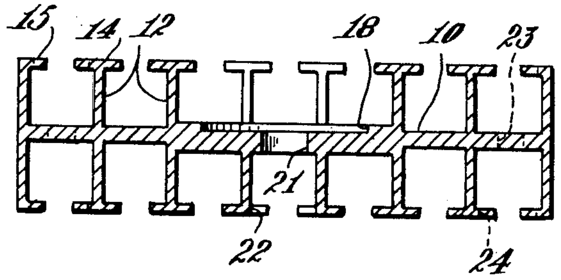
Figure 3:
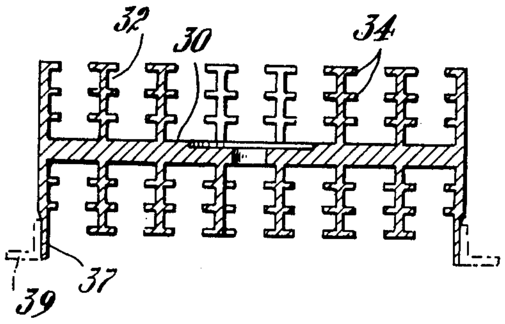
Figure 4:
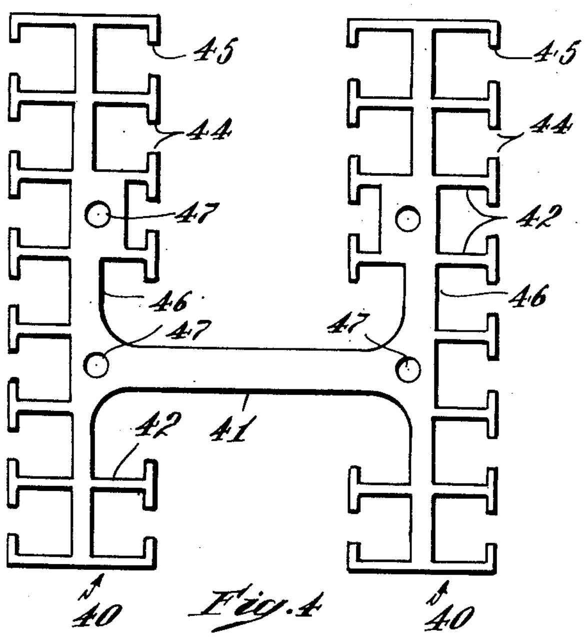
Figure 7:
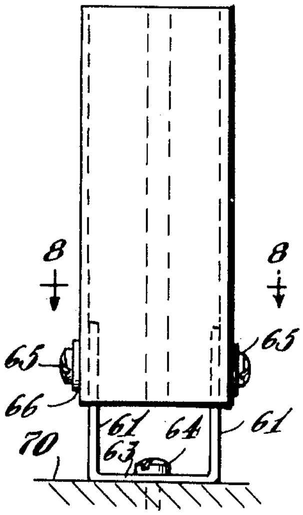
Figure 9:
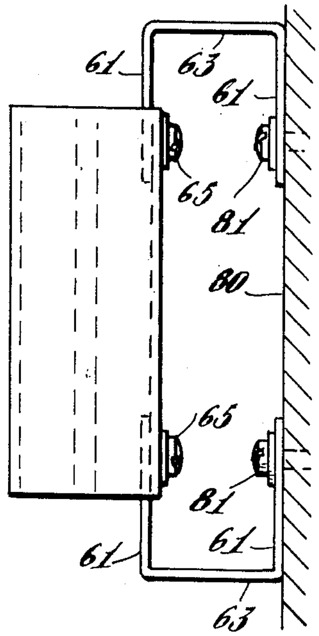
Figures 5, 6:
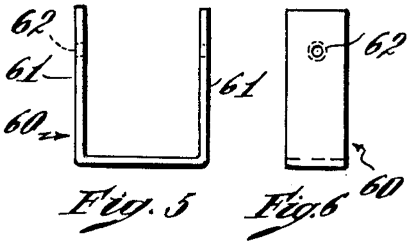
Figure 8:
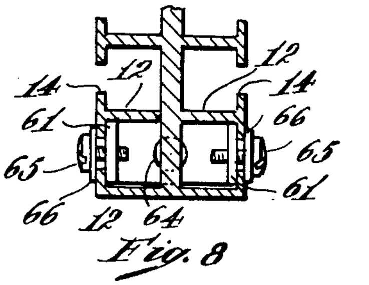

For purposes of illustration preferred embodiments of the present invention are shown in the accompanying drawings in which FIG. 1 is a plan view of a heat radiator;
FIG. 2 is a section on the line 2—2 of FIG. 1;
FIG. 3 is a similar section of a modification;
FIG. 4 is a similar section of another modification;
FIG. 5 is a front view of a radiator mount;
FIG. 6 is a side view of the radiator mount;
FIG. 7 illustrates one method of mounting the radiator of FIG. 1;
FIG. 8 is a section on the line 8—8 of FIG. 7; and
FIG. 9 illustrates another method of mounting the radiator of FIG. 1.

Referring now to the drawings the body of the heat radiator shown in FIG. 1 is a substantially flat rectangular plate 10. Preferably, as shown in FIG. 2, the plate is somewhat thicker near its middle than near the edges since the middle portion will pass the heavier thermal load. Projecting from either face of the plate 10 are a series of parallel fins 12. Each fin terminates in a flange which extends away from the fin in a direction parallel the plate 10. The flanges 14 on the interior fins project in both directions away from the fin itself while the flanges 15 on the outer fins project only inwardly so as to leave a flush exterior on the radiator as a whole. Except for the ends of the radiator, all surfaces extend substantially parallel to the length of the fins.

It is an advantage of the present construction that the structure as thus far described may be manufactured by the relatively inexpensive process of extrusion, all transverse sections of the radiator being similar except for whatever provisions are made for mounting the heat producing elements and the radiator itself. A further advantage of this arrangement and method of manufacture is that the radiator may be made of any desired length, that is the dimension from top to bottom as shown in FIG. 1, whereby the thermal capacity may be conveniently predetermined.

In order that the heat producing element, such as a transistor, may be easily attached in a thermally conductive relationship with the plate 10, the fins 12 and flanges 14 are cut away flush with the plate 10 as at 17 near the center of the plate. Preferably a portion of this area, as at 18, is spot-faced so as to provide a junction of low thermal resistance. A suitable mounting hole 21 is provided for the transistor, silicon diode or other heat producing element and the flanges 14 on the opposite side of the plate are cut away as at 22 to provide clearance for a corresponding nut.

For mounting the radiator itself there are provided, at each corner of the plate 10, apertures 23 for receiving mounting bolts. The flanges 14 and 15 are cut away as at 24 so as to clear the heads of the bolts and any nuts or spacers which may be required.

FIG. 3 illustrates a modification of somewhat greater complexity and having a correspondingly increased heat-dissipating capacity. The fins 32 project a relatively greater distance from the plate 30 and include a plurality of transverse flanges 34. The fins at the sides of the radiator include at one end portions 37 which project beyond the rest of the fins. By these extending portions 37 the radiator may be mounted, as by angle brackets 39, to a chassis. It should be noted that this modification can also be largely manufactured by extrusion.

While the heat handling capacities of the above-described radiators are increased by having fins and flanges projecting from both faces of the flat plate, there are some situations in which it may be desirable to have the fins projecting from only one face and thus the present invention should be understood to include such a construction.

FIG. 4 illustrates a modification which provides a relatively heavy heat-dissipating capacity and which facilitates a simple mounting of both the heat producing element and of the radiator itself. In this embodiment two heat radiating sections 40, each of which is generally similar to one of the radiators as shown in FIG. 1, are joined by a heavy thermal bus bar 41. As in the example of FIG. 1, each of the radiating units includes a series of parallel fins 42 terminating in transverse flanges 44 and 45. In the thicker central portion 46 of each radiating section 40 there are provided a pair of holes 47 by which the radiator may be mounted on an electrical bus bar or similar structure. A heat producing element, such as a silicon rectifier, can conveniently be centrally mounted on the thermal bus bar 41, appropriate apertures being provided. This modification also can be manufactured largely by extrusion, substantially all sections being similar.

In FIGS. 5 and 6 there is illustrated a mounting device for use in combination with the heat radiators according to the invention and particularly the embodiment shown in FIG. 1. The mount is a U-shaped strip 60, the two arms 61 of which are of a width just fitting between fins 12 of the radiator of FIG. 1 and are spaced by the yoke 63 so as to lie just inside of opposed flanges 14. Each of the arms 61 is apertured as at 62. These apertures can either be threaded as shown or the device can utilize separate nuts for the same purpose.

FIGS. 7 and 8 illustrate the manner in which these mounts may be used to hold a radiator in an upstanding relation to a flat surface 70. The yokes 63 of each of a pair of the U-shaped mounts 60 are attached to the surface 70 as by screws 64. A radiator is fitted over the arms 61 of the strip with a fin 12 passing to either side of each arm and with the respective transverse flanges 14 lying parallel to the width of the arms 61. The radiator is secured to the mount by bolts 65 and washers 66 between adjacent flanges 14 and engaging and passing the threaded apertures 62 with the heads of the bolts bearing against the respective flanges 14.

FIG. 9 illustrates the manner of using the mounts for attaching a radiator so as to lie parallel to the surface to which it is secured. In this arrangement only one arm 61 of each mount is fitted between the flanges 12 of a radiator and held there by a bolt 65. The other arm of each mount is secured to the mounting surface 80 by a screw 81 with the yoke 63 of each mount serving to space the radiator from the surface 80.

It can thus be seen that by the use of the mounts illustrated the radiators according to the invention may be mounted in a variety of orientations with respect to the mounting surface. Typically it will be desired that the radiators be oriented with the fins extending vertically so that convection currents will provide a maximum flow of air across the radiating surfaces.

It should be understood that this disclosure is for the purpose of illustration only and that the present invention includes all modifications and equivalents falling within the scope of the appended claims.

I claim:

1. A heat radiator constitued by a single H-shaped piece of heat-conductive material including a pair of parallel leg plates having central portions connected by a transverse thermal bus bar, each of said plates having a plurality of parallel fins extending transversely therefrom at opposite sides thereof, each of said fins having only one flange, each flange terminating and extending transversely from its fin in a plane parallel to the associated plate, said bus bar having means for mounting a heat generating element thereon in heat conductive contact therewith, whereby optimum dissipation of heat from said element is accomplished by the transfer of heat along said bus bar in opposite directions to said plates, along said plates in opposite directions to the fins and to the flanges at opposite sides of said plates, and to the air surrounding said radiator.

2. A heat radiator constituted by a single H-shaped piece of heat conductive material including a pair of substantially parallel leg plates each having at its opposite ends and at spaced locations between its ends a plurality of parallel fins extending perpendicularly from the plates at opposite sides thereof, each of said fins having only one flange, the single flange of each fin extending from the end of the fin and being parallel to said plates, the flanges associated with each plate lying in a pair of parallel planes at opposite sides of the plate, the fins and their flanges associated with each plate defining with the plate the walls of a plurality of rectangular passages for the circulation of air adjacent said radiator, said plates having central portions joined by a thermal bus bar with means for mounting a heat generating element thereon, whereby optimum dissipation of heat from said element is accomplished by the transfer of heat along said bus bar in opposite directions to said plates, along said plates in opposite directions to the fins and to the flanges at opposite sides of said plates, and to the air surrounding said radiator.

3. The radiator of claim 1, each of said plates having a central portion adjacent said bus bar which is thicker than end portions of the plate.

4. The radiator of claim 2, the cross-sections of said piece at planes perpendicular to said plates and fins being substantially identical.

5. The radiator of claim 2, said piece having a plurality of mounting holes therethrough parallel to said plates.

6. In combination, a heat radiator comprising a substantially flat plate having a plurality of spaced fins extending transversely from at least one side thereof, said fins having flanges spaced from said plate, said fins and their flanges defining with said plate the walls of a plurality of box-like passages, at least one of said walls having a gap defined by a pair of spaced opposed wall edges, and support means for said radiator having elements which engage opposite sides of said one wall adjacent said edges and an element extending through said gap to join the foregoing elements.

7. The combination of claim 6, said support means comprising a U-shaped bracket having one leg thereof constituting one of said elements engaging a side of said one wall, the other leg thereof having means for attaching said bracket to a base.

8. The combination of claim 6, the last-mentioned element comprising a screw.

9. In combination, a heat radiator comprising a substantially flat plate having a plurality of spaced fins extending transversely from opposite sides thereof, a pair of adjacent fins at each side of said plate having aligned flanges, and supporting means comprising a U-shaped bracket, the legs of said bracket entering into the space between said aligned flanges and the opposite sides of said plate and being attached to said aligned flanges, the cross-bar of said bracket having means for attaching said bracket to a base.

10. The combination of claim 9, said aligned flanges having spaced opposed edges, said legs being attached to said aligned flanges by screws passing between the opposed edges of the flanges.

References Cited in the file of this patent

UNITED STATES PATENTS

| | | |
|---|---|---|
| 711,446 | Thacker | Oct. 14, 1902 |
| 755,399 | Shambaugh | Mar. 22, 1904 |
| 1,909,708 | Neuwirth | May 16, 1933 |
| 2,343,387 | Sargent et al. | Mar. 7, 1944 |
| 2,388,532 | De Lange et al. | Nov. 6, 1945 |
| 2,681,164 | Kalfen | June 15, 1954 |
| 2,799,481 | Becker | July 16, 1957 |
| 2,806,187 | Boyer et al. | Sept. 10, 1957 |
| 2,935,664 | Scharli | May 3, 1960 |
| 2,947,957 | Spindler | Aug. 2, 1960 |
| 2,965,819 | Rosenbaum | Dec. 20, 1960 |
| 2,984,457 | Wulc | May 16, 1961 |
| 2,984,774 | Race | May 16, 1961 |
| 2,992,538 | Poganski | July 18, 1961 |
| 3,058,020 | Bolan | Oct. 9, 1962 |
| 3,081,824 | Macall | Mar. 19, 1963 |

FOREIGN PATENTS

| | | |
|---|---|---|
| 219,887 | Australia | Jan. 30, 1959 |
| 436,656 | Great Britain | Oct. 16, 1935 |
| 768,103 | Great Britain | Feb. 13, 1957 |